Feb. 1, 1938.  E. S. PEARCE  2,106,986
APPARATUS FOR TREATING FIBROUS WASTE FOR JOURNAL BOX USE
Filed Jan. 9, 1934  2 Sheets-Sheet 1

INVENTOR
EDWIN S. PEARCE
BY
Brockett, Hyde, Higley & Meyer
ATTORNEYS

Feb. 1, 1938. E. S. PEARCE 2,106,986
APPARATUS FOR TREATING FIBROUS WASTE FOR JOURNAL BOX USE
Filed Jan. 9, 1934 2 Sheets-Sheet 2

INVENTOR
EDWIN S. PEARCE
BY
Brockett, Hyde, Higley & Meyer
ATTORNEYS

Patented Feb. 1, 1938

2,106,986

UNITED STATES PATENT OFFICE 2,106,986

APPARATUS FOR TREATING FIBROUS WASTE FOR JOURNAL BOX USE

Edwin S. Pearce, Indianapolis, Ind., assignor to Railway Service & Supply Corporation, Indianapolis, Ind., a corporation of Indiana Application January 9, 1934, Serial No. 705,917

7 Claims. (Cl. 68—23)

This invention relates to apparatus for treating fibrous waste for journal box use, the present invention relating to the treatment of both new waste not before supplied with journal oil and old waste containing more or less dirty journal oil.

As pointed out in one or more of my prior patents for subject matter of this general character, particularly in my Reissue Patent No. 18,599, granted September 13, 1932, new waste normally contains, as the result of its manufacture, more or less lint, and unless such lint is removed, the effectiveness of the waste as a carrier for journal oil is materially reduced. Likewise, old waste contains more or less lint as the result of its use in journal boxes, and the removal of such lint, as well as the removal of dirt, moisture, bits of metal, etc., which old waste normally contains after use thereof, is quite essential if the reclamation of the waste is to be complete.

It is therefore the general object of the present invention to provide an improved apparatus for treating fibrous waste, both new waste and old waste, to effectively and efficiently remove therefrom all of the objectionable content thereof and to otherwise treat and condition such waste for subsequent journal box use.

A further object of the present invention is the provision of improved waste treating apparatus in the form of a single simple and inexpensive machine, with which are performed all of the steps of the present improved waste treating method, said method requiring for its performance a minimum handling of the waste and minimum amounts of time and labor.

Further and more detailed objects of the present invention are in part obvious and in part will appear more in detail hereinafter.

Figure 1:
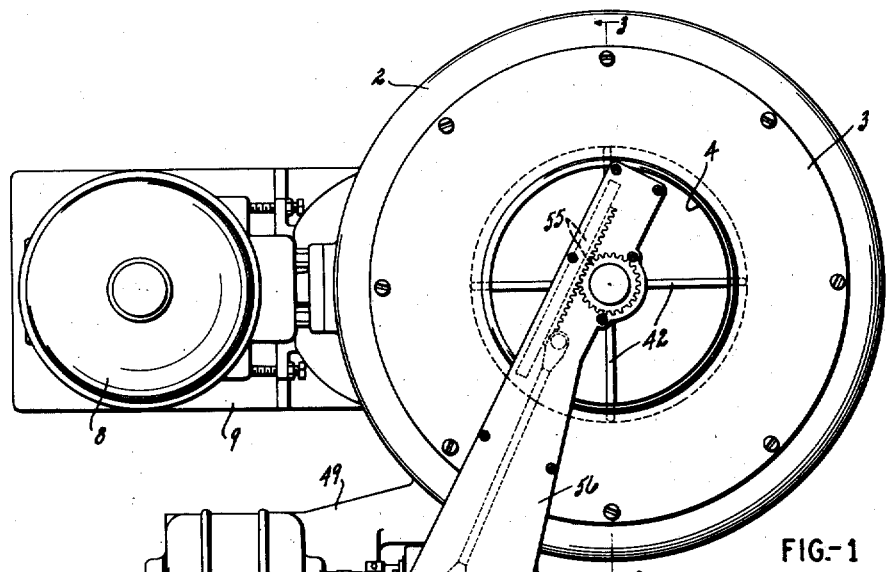
Figure 2:
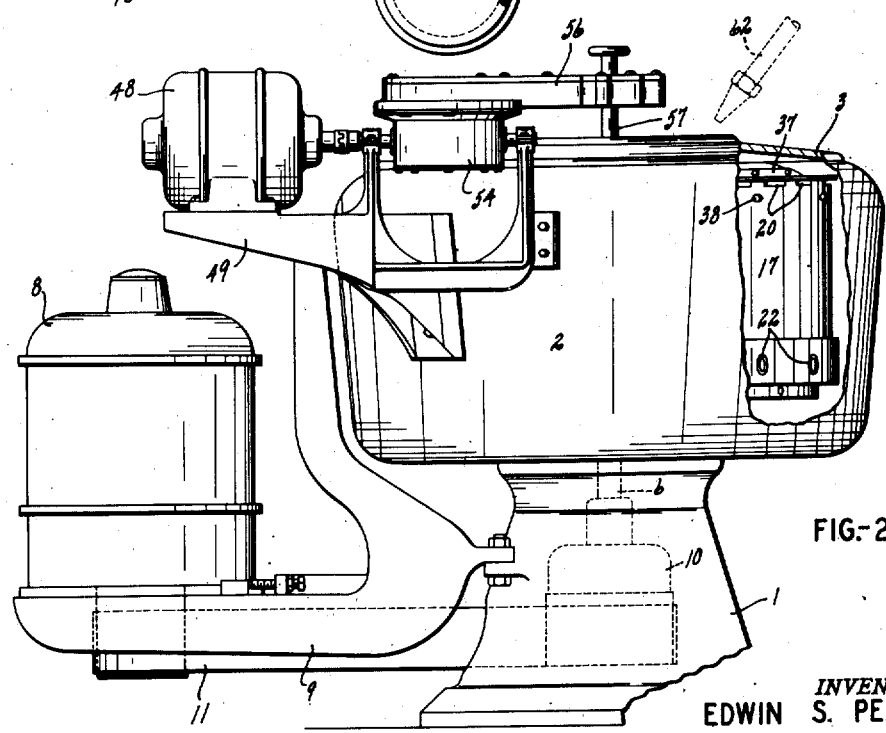
Figure 4:
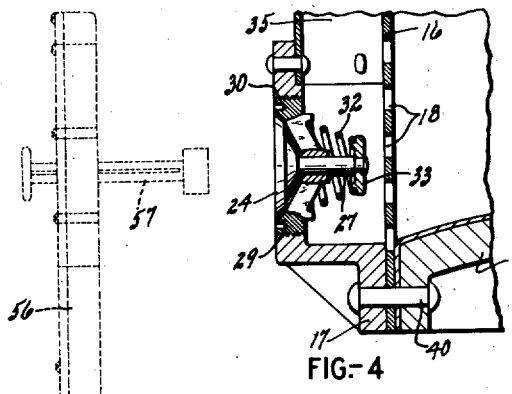
Figure 5:
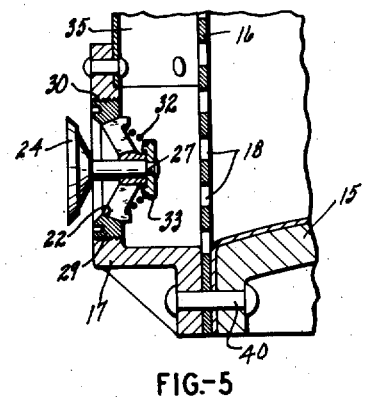
Figure 3:
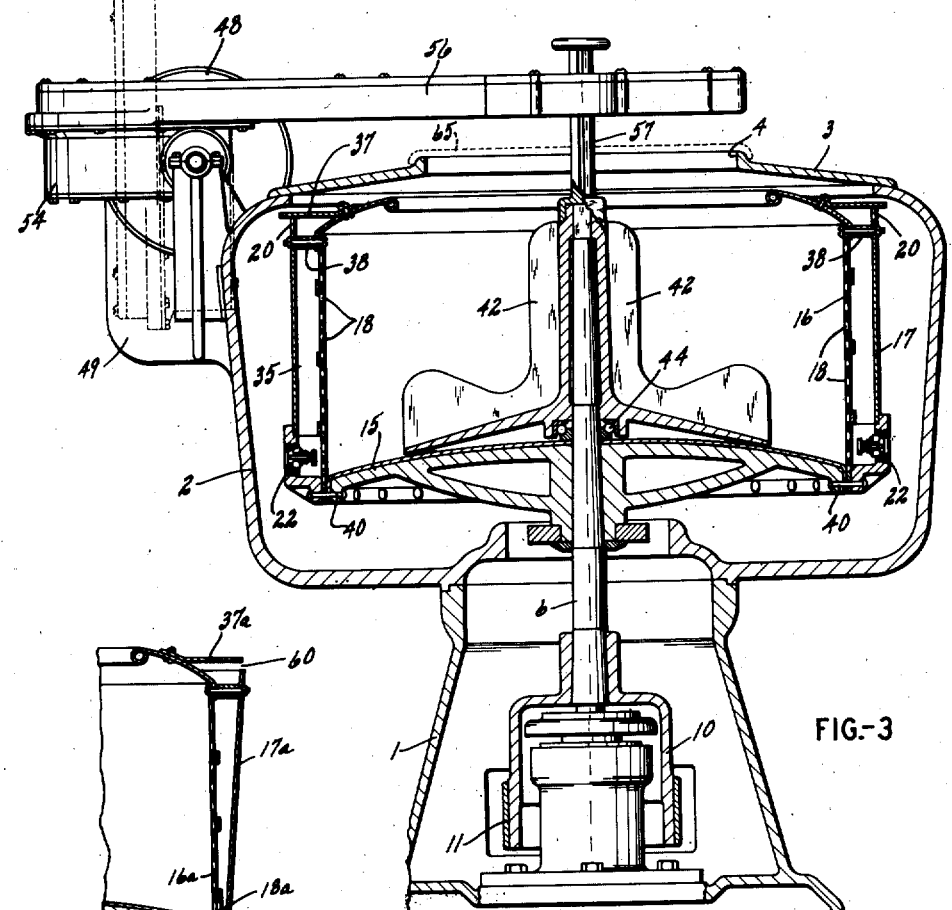
Figure 6:
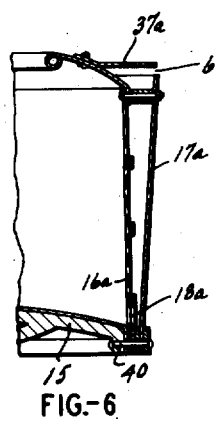

The invention will be readily understood from the following description thereof, reference being had to the accompanying drawings in which Fig. 1 is a top plan view of the present improved waste treating apparatus, by the sole use of which the present improved method is performed; Fig. 2 is a side elevation of said apparatus, part of the curb or casing thereof being broken away to show the waste-receiving basket or container therein; Fig. 3 is a vertical sectional view of such apparatus, the view being on the line 3—3 of Fig. 1; Fig. 4 is an enlarged detail vertical sectional view of one of the valve-controlled liquid discharge ports of the waste-receiving basket or container of the present apparatus, said port being in closed condition; Fig. 5 is a similar view of such port in open condition; and Fig. 6 is a detail vertical sectional view of a portion of a slightly modified form of waste-receiving basket or container.

The present improved waste treating apparatus is generally similar to the waste treating apparatus of my aforesaid reissue patent, both pieces of apparatus being more or less modified forms of a rather well known type of centrifugal extractor.

As will be readily observed in the accompanying drawings, the present apparatus has a specially constructed waste-receiving basket or container, of such character that when said container is stationary a treating liquid, such as hot journal oil, may be readily held or contained therein. Upon rotation of said container, however, an appreciable portion of said liquid is discharged therefrom, said liquid carrying away with it all of the objectionable content of said waste which has been transferred thereto. To effect a most intimate contact of said waste and said treating liquid, to thereby transfer to said liquid all or substantially all of the objectionable content of said waste, said container is provided with suitable agitating means, operation of which only occurs when said container is stationary and hence in condition to hold the treating liquid supplied thereto.

In practicing the present improved method, the waste to be treated and a treating liquid, such as hot journal oil, are placed in the rotatable basket or container of the present apparatus, said basket or container being in a stationary and hence liquid-holding condition. The ingress of the waste and the treating liquid into the basket or container may occur simultaneously, or the ingress of one may precede the other, it usually being more convenient to supply the container with the treating liquid after the waste has been placed therein. After the waste and the treating liquid have been placed in the container, and while said container is yet stationary, the agitating means is operated, the result of which is to open up the fibres of the waste and effect a most intimate contact or intermingling of the treating liquid therewtih. The objectionable content of the waste, including its lint, cinders, dirt, etc., is more or less completely transferred to said liquid, and after sufficient time has elapsed for such a condition to be brought about, operation of the agitating means is terminated and rotation of said container is initiated, the latter operation effecting the removal from the waste in said container of an appreciable portion of said liquid and hence of the objectionable content of the waste transferred thereto.

If desired, said oil treating and oil removing steps may be repeated, any subsequent treating steps in the reclamation of old waste being performed preferably with cleaner oil than that originally used. By so doing, the dirty oil of the oil films surrounding the individual waste fibres can be replaced with cleaner oil, the desirability of which is pointed out in my prior Patent No. 1,877,754, granted September 13, 1932. After the waste has been freed of its lint and other objectionable content, and while it is yet in the container of the present improved apparatus, it may be subjected to another agitating effect to again open up its fibres and to facilitate the vaporization of any moisture remaining therein, after which it may be supplied with a proper amount of journal oil and thus made ready for journal box use.

Referring now in detail to the present improved waste treating apparatus, 1 represents the base thereof and 2 a stationary curb or casing mounted thereon, the cover 3 of said curb or casing having a centrally disposed opening 4 for the reception of agitator operating means hereinafter described.

Suitably mounted in said base and extending upwardly into said curb or casing is a vertically disposed shaft 6, rotation of which is produced by any suitable power means. As here shown, an electric motor 8 is employed for effecting rotation of said shaft, said motor being mounted on a bracket 9 suitably secured to the base 1 and being operatively connected to a pulley 10 on the lower end of said shaft through the instrumentality of a belt 11.

Suitably mounted on said shaft 6, within the curb or casing 2, is a waste-receiving basket or container, said basket or container differing from the usual centrifugal extractor basket or container chiefly because of the additional peripheral wall with which it is provided.

In the embodiment of the invention shown in Figs. 1 to 5 inclusive, the waste-receiving basket or container is provided with a suitable imperforated bottom wall 15, as is usual, and a pair of spaced peripheral walls 16, 17, the inner wall 16 being provided throughout substantially its entire area with relatively small, closely spaced apertures 18 and the outer wall 17 being provided with perforations only at its upper and lower ends. At its upper end, said outer wall is provided with a circumferentially disposed series of notches 20, and at its lower end, said wall is provided with a circumferentially disposed series of ports 22.

When the basket or container is stationary, and such is its condition during loading and unloading thereof and during operation of the hereinafter described agitating means, the ports 22 are closed by spring pressed valves 24, as shown in Fig. 4, at which times said basket or container is capable of holding or containing a treating liquid, such as hot journal oil, up to the level of the notches 20. Upon rotation of said basket or container, however, and such rotation is effected when it is desired to remove therefrom the treating liquid supplied thereto, the valves 24 controlling said ports are thrown outward by centrifugal force, as in Fig. 5, with consequent opening of said ports and ejection from said basket or container of at least the major portion of said treating liquid.

As best shown in Figs. 4 and 5, the stem 27 of each valve 24 extends through a ported disc 29 threaded or otherwise suitably secured in an opening 30 in the outer wall 17 of said basket or container, said valve being normally held inwardly, in closing position relative to the ports 22 of said disc, by a coiled spring 32 surrounding said valve stem and bearing against said disc and a collar 33 with which the inner end of said stem is provided. The amount of centrifugal force necessary to effect opening of these valves 24 is regulated by the compressive strength of the springs 32, the strength thereof being preferably sufficient to effect closing of said valves against a hydrostatic head of hot journal oil of a depth substantially equal to that of said basket or container. Any desired number of these valve controlled liquid discharge ports may be employed in the basket outer wall 17, twenty-four such ports having been found to be quite satisfactory for a basket or container having a diameter of twenty-eight inches or so.

In order to prevent treating liquid in the annular space 35 between the inner and outer peripheral walls 16, 17 of said basket or container from being thrown upwardly out of said space, upon rotation of said basket or container, the inner wall 16 thereof is provided with a suitable imperforate cover plate 37 for said space, the inner edge portion of said cover plate being bolted or otherwise suitably secured to said inner wall and the outer edge portion of said cover plate overlying and resting upon the upper edge of said outer wall. Because of this cover plate, any liquid leaving the basket or container, as the result of rotation thereof, must do so through the notches 20 or the valve controlled ports 22.

To insure proper spaced relation of the upper portions of said inner and outer basket walls 16, 17, said portions are suitably interconnected at 38 in such relation, and to economically secure the desired rigidity for said inner wall, suitable reenforcing bands are provided therefor, as shown. As is usual, the bottom wall 15 of said basket or container is suitably secured to the shaft 6 for rotation therewith, said bottom wall having riveted or otherwise suitably secured thereto, as at 40, the lower ends of said basket side walls 16, 17.

Suitably mounted in said basket or container, for oscillatory movement about the shaft 6 as a center, is a multi-bladed agitator 42, the primary function of which is to effect a more intimate contact or intermingling of the treating liquid with the waste being treated. Preferably and as shown, a ball-bearing support 44 or the like is provided for said agitator to facilitate oscillatory movement thereof, such movement being effected by any suitable power means.

In the embodiment of the invention here illustrated, an electric motor 48 is employed for effecting oscillatory movement of said agitator, said motor being mounted on a curb or casing bracket 49 and being operatively connectible to said agitator by any suitable means. Such a means may include suitable speed reducing mechanism, such mechanism (not shown) being contained in the housing 54 of the present apparatus, crank-operated rack and pinion mechanism 55 contained in a suitable housing 56, and a socket shaft 57 carried by said housing 56 and adapted for operative connection with the upper end of the agitator 42.

During operation of said agitator, the crank motion housing 56 has a horizontally disposed position overlying the curb or casing 1 and the waste-receiving basket or container therein, as shown in full lines in Figs. 1, 2, and 3, the socket shaft 57 carried by said housing being detachably connected to said agitator. When operation of said agitator is not desired, the crank motion housing 56 and the socket shaft 57 carried thereby are swung upwardly to an inoperative, out-of-the-way position, as shown in dotted lines, Fig. 3, in which position loading and unloading of the basket or container are not hampered or otherwise interfered with.

In Fig. 6, a slightly modified form of waste-receiving basket or container is shown, said basket or container differing from the basket or container of Figs. 1 to 5 inclusive only in the construction of its peripheral walls 16a, 17a. As shown, the inner wall 16a of the basket or container of Fig. 6 is provided at its lower end with a circumferentially disposed series of enlarged liquid discharge apertures 18a, of slot-like or other suitable form, and the outer wall 17a of said basket or container is of imperforate character throughout.

To effect the desired discharge of treating liquid from this modified form of basket or container, upon rotation thereof, the outer imperforate wall 17a thereof is of upwardly and outwardly flared form, the upper edge thereof being spaced from the cover plate 37a to provide therebetween an annular passageway 60 for the discharge of said treating liquid.

In carrying out the present improved method of treating or conditioning waste, the waste to be treated or conditioned and a treating or conditioning liquid, such as hot journal oil, are placed in the basket or container of the present improved apparatus, the entry of the oil thereinto being effected by the use of a suitable supply hose 62 or the like, Fig. 2. Preferably, the waste is placed in said basket or container first, and then the oil is added, the space remaining in the basket or container after the waste is placed therein being preferably filled with oil. During this loading operation, the basket or container is stationary, so that if its outer peripheral wall is provided with valve controlled discharge ports, such as the ports 22 of Figs. 1 to 5 inclusive, said ports will be closed.

The addition of such hot oil to the waste materially increases the fluidity of any oil which the waste contains (and used waste contains more or less dirty oil in a more or less viscous state) and also effects vaporization of at least an appreciable portion of any moisture which the waste may contain. A further result of the addition of such hot oil is to transfer to said oil an appreciable portion of the lint which both new and old waste normally contain and an appreciable portion of the dirt, cinders, bits of metal, etc., which old waste always contains as the result of its use in journal boxes. Inasmuch as the annular space 35 between the container side walls 16, 17 is filled with oil, the outer side wall portions of the mass of waste within said container is subjected to the treating effects of said oil, as will be readily understood.

The next step in the treatment or conditioning of the waste is to operatively connect the motor 48 to the agitator 42, the operation of said agitator effecting a most intimate contact or intermingling of the treating oil with the waste and resulting in a more or less complete transfer to said oil of all of the objectionable content of said waste.

The next step in the treatment or conditioning of the waste is the removal therefrom of as much of said treating oil as possible, a result accomplished by rotating said basket or container at a relatively high speed. All objectionable content of the waste transferred to the oil leaves said container therewith, said oil leaving the container of Figs. 1 to 5 inclusive through the notches 20 and the now open ports 22 and leaving the container of Fig. 6 by flowing upwardly over the upper end of the outer imperforate wall 17a thereof. From the curb or casing 2, the discharged oil, with the objectionable content of the waste transferred thereto, flows through a suitable discharge conduit (not shown) to a suitable reservoir, oil reclamation plant or to any other device or apparatus, as desired. During the oil removing operation, the curb or casing 2 is preferably provided with a suitable cover 65, such as shown in dotted lines, Fig. 3.

If desired and as will be readily understood, the above steps may be repeated, the advisability of so doing depending upon the condition of the waste being treated. In the treatment of old waste, any subsequent oil washing steps should be performed, preferably, with cleaner oil than that originally used, to thereby replace the oil of the oil films surrounding the individual waste fibres with cleaner oil. As pointed out in my aforesaid Patent No. 1,877,754, said oil films cannot be removed by an extracting operation but, by the use of a method such as here described, the oil of said films can be replaced by other and cleaner oil.

Either before or after the treatment of the waste with oil, in the manner here set forth, said waste may be treated with other fluids, although such other treatment is usually not necessary, so effective is the present method.

After removal of the treating oil and the objectionable content of the waste transferred thereto, and while said waste is yet in the container of the present apparatus, a proper amount of lubricating oil may be added to said waste, thereby making it ready for journal box use.

Further features and advantages of the present improved apparatus and the present improved method will be apparent to those skilled in the art to which it relates.

What I claim is:

1. Apparatus of the character described, comprising a stationary casing, a work-receiving basket structure rotatably mounted therein, said basket structure having spaced peripheral walls, the outer one of which is provided with a plurality of apertures, closures for said apertures slidably mounted on said outer peripheral wall, and spring means for normally maintaining said closures in closing position relative to said apertures, said spring means lying in the space between the peripheral walls of said basket structure.

2. Apparatus of the character described, comprising a stationary casing having a work-receiving basket structure rotatably mounted therein, said basket structure having spaced peripheral walls, the outer one of which is of upwardly and outwardly flaring imperforate form and the inner one of which is of perforate form, with a series of perforations of larger cross-dimensions than the perforations thereabove adjacent the lower end thereof.

3. Apparatus of the character described, comprising a stationary casing, and a work-receiving basket structure rotatably mounted therein, said basket structure having spaced peripheral walls, the inner one of which is provided adjacent its lower end with generally vertically extending, circumferentially disposed elongated apertures and being provided above said elongated apertures with relatively closely spaced apertures of reduced cross-dimensions.

4. Apparatus for treating fibrous waste for journal box use, comprising a stationary casing, a rotatable shaft in said casing, a work-receiving basket structure arranged within said casing and mounted on said shaft for rotation therewith, said basket structure having spaced peripheral walls, the outer one of which is constructed and arranged to retain oil when stationary and the inner one of which is of perforate form, said outer peripheral wall being arranged for discharge of oil therefrom when in rotation, agitating means arranged in said basket structure for rotary movement about said shaft and on which agitating means work may be placed, means for effecting rotary movement of said agitating means about said shaft, and means for rotating said shaft and hence said basket structure.

5. Apparatus of the character described, comprising a stationary casing, a work-receiving basket structure rotatably mounted therein, agitating means arranged in said basket structure and on which work may be placed, means for operating said agitating means, and motor means for rotating said basket structure, said operating means for said agitating means including a motor and operative connections between said motor and said agitating means, said last named motor having a stationary mounting and said operative connections being movable between a generally horizontally disposed operative position and a generally vertically disposed inoperative position.

6. Apparatus of the character described, comprising a stationary casing, a shaft rotatable in said casing, a work-receiving basket structure arranged within said casing and mounted on said shaft for rotation therewith, agitating means arranged within said basket structure for rotary movement about said shaft, motor means for rotating said shaft and hence said basket structure, and means for operating said agitating means, said operating means including a motor and connecting means for operatively connecting said motor and said agitating means, said connecting means including rack and pinion mechanism and a socket driving shaft and being movable between an operative position over said basket structure and an inoperative position at one side of said basket structure.

7. Apparatus for treating fibrous waste for journal box use, comprising a stationary casing, a rotatable shaft in said casing, a work-receiving basket structure arranged within said casing and mounted on said shaft for rotation therewith, said basket structure having spaced peripheral walls, the inner one of which is of cylindrical form and of perforate character and the outer one of which is of upwardly and outwardly flaring form and of imperforate character, agitating means arranged in said basket structure for rotary movement about said shaft and on which agitating means work may be placed, means for effecting rotary movement of said agitating means about said shaft, and means for rotating said shaft and hence said basket structure.

EDWIN S. PEARCE.

CERTIFICATE OF CORRECTION.

Patent No. 2,106,986.     February 1, 1938.

EDWIN S. PEARCE.

It is hereby certified that error appears in the printed specification of the above numbered patent requiring correction as follows: Page 3, second column, lines 68 and 69, claim 2, strike out the words "of larger cross-dimensions than the perforations thereabove" and insert the same after "thereof" and before the period in line 70, same claim; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.

lower end with generally vertically extending, circumferentially disposed elongated apertures and being provided above said elongated apertures with relatively closely spaced apertures of reduced cross-dimensions.

4. Apparatus for treating fibrous waste for journal box use, comprising a stationary casing, a rotatable shaft in said casing, a work-receiving basket structure arranged within said casing and mounted on said shaft for rotation therewith, said basket structure having spaced peripheral walls, the outer one of which is constructed and arranged to retain oil when stationary and the inner one of which is of perforate form, said outer peripheral wall being arranged for discharge of oil therefrom when in rotation, agitating means arranged in said basket structure for rotary movement about said shaft and on which agitating means work may be placed, means for effecting rotary movement of said agitating means about said shaft, and means for rotating said shaft and hence said basket structure.

5. Apparatus of the character described, comprising a stationary casing, a work-receiving basket structure rotatably mounted therein, agitating means arranged in said basket structure and on which work may be placed, means for operating said agitating means, and motor means for rotating said basket structure, said operating means for said agitating means including a motor and operative connections between said motor and said agitating means, said last named motor having a stationary mounting and said operative connections being movable between a generally horizontally disposed operative position and a generally vertically disposed inoperative position.

6. Apparatus of the character described, comprising a stationary casing, a shaft rotatable in said casing, a work-receiving basket structure arranged within said casing and mounted on said shaft for rotation therewith, agitating means arranged within said basket structure for rotary movement about said shaft, motor means for rotating said shaft and hence said basket structure, and means for operating said agitating means, said operating means including a motor and connecting means for operatively connecting said motor and said agitating means, said connecting means including rack and pinion mechanism and a socket driving shaft and being movable between an operative position over said basket structure and an inoperative position at one side of said basket structure.

7. Apparatus for treating fibrous waste for journal box use, comprising a stationary casing, a rotatable shaft in said casing, a work-receiving basket structure arranged within said casing and mounted on said shaft for rotation therewith, said basket structure having spaced peripheral walls, the inner one of which is of cylindrical form and of perforate character and the outer one of which is of upwardly and outwardly flaring form and of imperforate character, agitating means arranged in said basket structure for rotary movement about said shaft and on which agitating means work may be placed, means for effecting rotary movement of said agitating means about said shaft, and means for rotating said shaft and hence said basket structure.

EDWIN S. PEARCE.

CERTIFICATE OF CORRECTION.

Patent No. 2,106,986.   February 1, 1938.

EDWIN S. PEARCE.

It is hereby certified that error appears in the printed specification of the above numbered patent requiring correction as follows: Page 3, second column, lines 68 and 69, claim 2, strike out the words "of larger cross-dimensions than the perforations thereabove" and insert the same after "thereof" and before the period in line 70, same claim; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.

CERTIFICATE OF CORRECTION.

Patent No. 2,106,986.  February 1, 1938.

EDWIN S. PEARCE.

It is hereby certified that error appears in the printed specification of the above numbered patent requiring correction as follows: Page 3, second column, lines 68 and 69, claim 2, strike out the words "of larger cross-dimensions than the perforations thereabove" and insert the same after "thereof" and before the period in line 70, same claim; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.